Hans J. Wilkens
Andrew Shoh
INVENTORS.

BY:

Hans J. Wilkens
Andrew Shoh
INVENTORS.

Hans J. Wilkens
Andrew Shoh

United States Patent Office 3,469,211
Patented Sept. 23, 1969

3,469,211
OSCILLATORY CIRCUIT FOR ELECTRO-ACOUSTIC CONVERTER WITH STARTING MEANS
Andrew Shoh, Ridgefield, and Hans Joachim Wilkens, New Fairfield, Conn., assignors to Branson Instruments, Incorporated, Stamford, Conn., a corporation of Delaware
Filed Oct. 16, 1967, Ser. No. 675,435
Int. Cl. H03b 5/30, 5/36
U.S. Cl. 331—116     11 Claims

ABSTRACT OF THE DISCLOSURE

A feedback type oscillatory circuit which includes an electro-acoustic converter is operated at the natural mechanical open circuit resonant frequency of the converter. In order to start the circuit under overload conditions when insufficient loop gain is available, a resistive starting device is temporarily inserted in the oscillatory circuit for increasing the loop gain.

---

This invention relates to an oscillatory circuit for driving an electro-acoustic converter which is subjected to loads of greatly varying acoustic impedance. More specifically, this invention refers to an oscillatory circuit which includes an electro-acoustic converter driven by a feedback circuit substantially at the natural mechanical open circuit or "parallel" resonant frequency condition of the converter and wherein means are provided for increasing the loop gain of the oscillatory circuit during the start-up period. Quite specifically, the present invention is directed to an oscillatory circuit for an electro-acoustic converter as described in copending application for U.S. Letters Patent, Serial Number 579,673 filed in the name of Andrew Shoh on Sept. 15, 1966, entitled "Oscillatory Circuit for Electro-Acoustic Converter" and concerns an auxiliary circuit means for modifying the load resistance of the oscillatory circuit during the start-up period thereof, thus causing an increase in the loop gain of the circuit in order to enable the oscillatory circuit to start under heavy load conditions.

In the patent application identified hereinabove, an oscillatory circuit has been revealed for driving an electro-acoustic converter adapted to produce high power ultrasonic energy. This energy is eminently suited for various ultrasonic high power processes, such as homogenization, biological cell disruption, ultrasonic welding, soldering and treatment of metals, to name a few. One of the problems encountered in applications of this type concerns the condition that the converter is subjected to non-linear acoustic loads, that is, the mechanical load impedance coupled to the converter changes as the process progresses. In a typical case, such as when welding thermoplastic parts, the mechanical load impedance initially reflected on the converter may be so great as to prevent, in view of insufficient loop power gain, the oscillatory circuit from breaking into oscillation. The present invention is directed to eliminating this condition by providing a means for increasing the loop gain during the start-up period of the oscillatory circuit and thereafter deleting the auxiliary means provided from the circuit, thus assuring reliable operation of the oscillatory circuit. To this end there is provided, in one typical embodiment, a resistive element connected in series with the converter, and a delay relay for effectively removing the resistance from the oscillatory circuit after the start-up period has passed.

One of the principal objects of this invention is, therefore, the provision of a new and improved oscillatory circuit for an electro-acoustic converter.

Another important object of this invention is the provision of an oscillatory circuit for operating an electro-acoustic converter substantially at its natural mechanical parallel resonant frequency condition and the provision of means for increasing the loop power gain of the oscillatory circuit during the start-up period.

Still another object of this invention is the provision of circuit means for enabling an ultrasonic converter coupled in an oscillatory circuit to operate upon energizing such oscillatory circuit, despite a temporary overloaded condition which would normally decrease the loop gain and prevent the converter from breaking into oscillation.

Further and still other objects of this invention will be more clearly apparent by reference to the following description when taken in conjunction with the accompanying drawings, in which.

Figure 1:
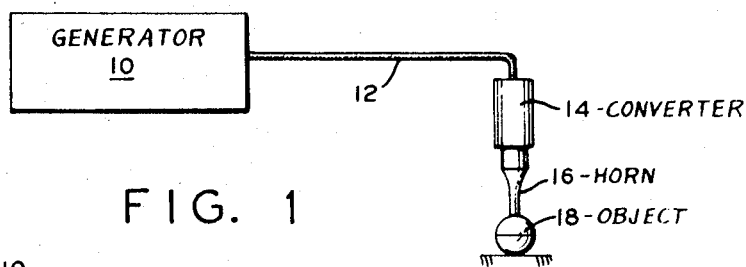
FIGURE 1 is a schematic illustration of the electro-acoustic converter and its driving means.

Referring now to the figures and FIGURE 1 in particular, numeral 10 identifies an electrical high frequency generator which is coupled via a cable 12 to an electro-acoustic converter 14 which is fitted with a mechanical impedance transformer 16, usually identified as a horn. In a typical set-up the electrical frequency is in the ultrasonic frequency range, i.e. 20 kHz., and the converter is of the construction as shown in U.S. Patent to S. E. Jacke et al., No. 3,328,610 dated June 27, 1967 entitled "Sonic Wave Generator." The converter receives electrical high frequency energy and includes one or more piezoelectric transducer disks for converting the electrical energy supplied to mechanical oscillations. The mechanical oscillations, occurring in axial direction, are amplified by the horn 16 which, as shown, is coupled with its frontal surface to two abutting hemispheres made of thermoplastic material to provide a weld, thus producing a spherical object 18. The welding process illustrated using ultrasonic energy is described in U.S. Patent to R. S. Soloff et al., No. 3,224,916 issued Dec. 21, 1965 entitled "Sonic Method of Welding Thermoplastic Parts."

In the copending application for Letters Patent supra it has been shown that a converter 14 of the type described above may be operated advantageously so that the frequency of oscillation of the circuit coincides substantially with the natural mechanical open circuit or parallel resonant frequency condition of the converter 14. In this mode, see FIGURE 2, the behavior of the converter 14 can be represented by the series capacitance $C_o$, representing the motion independent clamped capacitance, and the parallel connection of an inductance $L_p$, a capacitance $C_p$, a substantially constant internal resistance $R_i$, and a variable load impedance $R_L$ which equals 1/mechanical resistance where the mechanical resistance is defined as force divided by velocity. It will be understood that these components are "equivalent" value circuit elements, simulating the electrical characteristics of the converter in the vicinity of the desired mechanical resonance.

At the operating frequency of parallel resonance, the inductive reactance produced by $L_p$ and the capacitive reactance produced by $C_p$ are equal. Moreover, in order to operate at this resonant frequency an external circuit inductance L is provided and selected to produce an inductive reactance $X_L$ which compensates the clamped capacitive reactance $X_{C_o}$ produced by the capacitance $C_o$.

Figure 2:
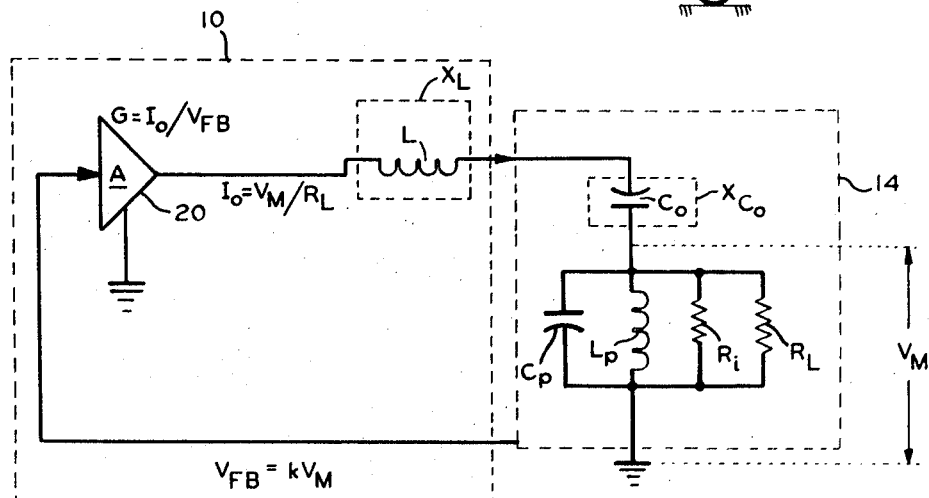
FIGURE 2 is a schematic electrical circuit diagram of the equivalent electrical circuit.

In the circuit shown in FIGURE 2, $V_M$ represents the motion dependent voltage which is effective upon the quantities $R_i$ and $R_L$. In the application described, the value of $R_i$ remains constant and is rather large and may be neglected in the further discussion, whereas the value of $R_L$ is subject to large changes. The feedback voltage $V_{FB}$ from the converter 14 to the amplifier 20 is the product of $kV_M$ wherein:

$k =$ a constant and $V_M =$ motion dependent voltage

The gain of the amplifier circuit 20 is defined as:

$$G = I_o / V_{FB}$$

wherein:

$G =$ gain
$I_o =$ current to converter
$V_{FB} =$ feedback voltage

Similarly, the current $I_o$ flowing at parallel resonance is equal to $V_M/R_L$.

The loop gain of the oscillatory circuit shown in FIGURE 2 and comprising the feedback controlled amplifier 20, the inductance L and the converter 14 is a function of the value of the load impedance $R_L$, and the requirement for oscillation is that the product of $GkR_L$ be equal or greater than unity. For the condition where the value of $R_L$ is less than $1/kG$, the feedback signal is insufficient to sustain oscillation of the circuit. This condition is indicated by reference to FIGURE 3. The curve 30 represents a typical load impedance which changes responsive to the application of ultrasonic energy and having initially a high mechanical impedance, therefore the value of $R_L$ at the point $R_{initial}$ is low. This latter value of $R_L$ heavily loads the circuit and since the value of $R_L$ is less than $1/kG$, the oscillatory circuit is unable to break into oscillation. The broken line indicates the condition where $R_L$ equals $1/kG$, representing the condition at which the oscillatory circuit could break into oscillation. At any point above this broken line, representing the condition when $R_L$ is greater than $1/kG$, the oscillator should break into oscillation.

Hence, if the circuit is to break into oscillation with an impedance $R_{initial}$, it is necessary to initially increase the value of $R_L$. The present invention accomplishes this condition by providing a starting device in the circuit, specifically by coupling a starting resistance having a circuit value of $R_S$ in series with the value of $R_L$. Under this condition it will be readily possible to satisfy the necessary starting condition where:

$$R_L + R_S \geq 1/kG$$

When the amplitude of mechanical motion of the converter has reached a magnitude corresponding to the load impedance value of $R_L$ which is greater than $1/kG$ the starting device can be removed from the circuit.

Figure 4:
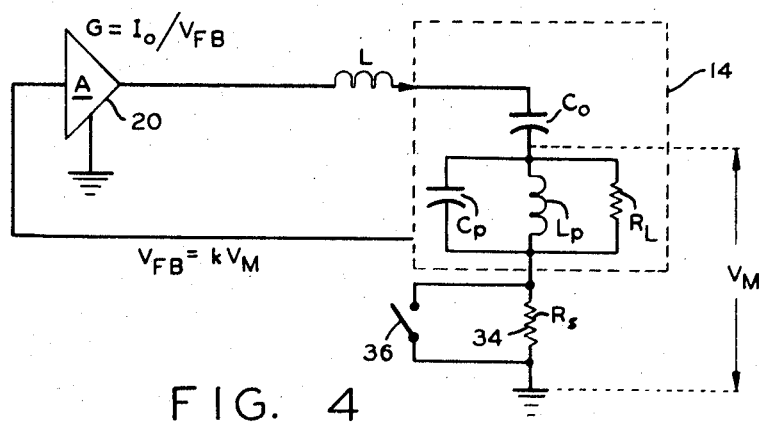
FIGURE 4 is a schematic electrical circuit diagram, same as FIGURE 2, but modified to show the start-up means comprehended by the present invention.

The modification effected in the circuit per FIGURE 2 is shown schematically in FIGURE 4. Numeral 34 identifies an additional resistance $R_S$ which is coupled in circuit with the converter 14, and numeral 36 identifies a switch coupled in parallel with the resistance 34 to short-circuit the resistance after the converter has passed through the start-up period and attained the vibration amplitude where the value of $GkR_L$ is equal or greater than unity.

Figure 5:
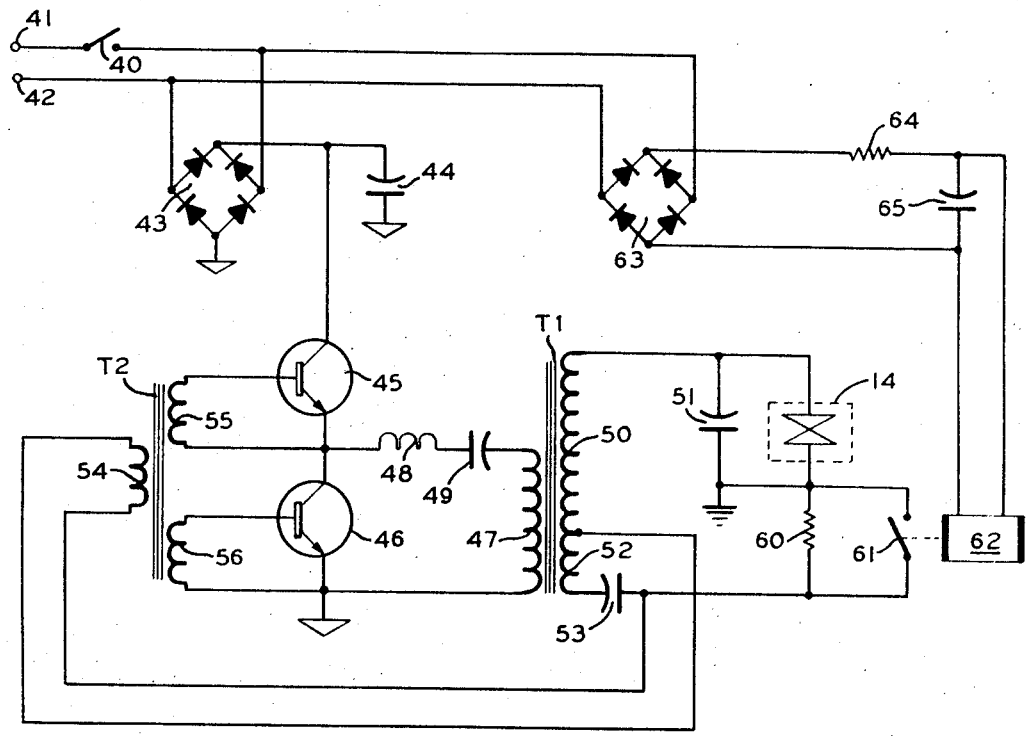
FIGURE 5 is a complete electrical circuit diagram of the oscillatory circuit, showing one of the embodiments of the present invention.

A typical actual embodiment of the above stated principle is shown in FIGURE 5. As far as the oscillatory circuit is concerned, it is substantially identical with that shown in FIGURE 10 of the copending application identified above. Upon closing the circuit switch 40, line voltage from the terminals 41, 42 is applied to a bridge type rectifier 43. A capacitor 44 is provided for filtering purposes.

The driving portion of the oscillatory circuit comprises essentially a set of switching transistors 45 and 46 which cyclically provide current flow through the primary winding 47 of the transformer T1, such flow being from the rectifier 43 via the inductance 48 and a direct current blocking capacitor 49. The load circuit includes the secondary windings 50 and 52 of the transformer T1, the electro-acoustic converter 14, the parallel capacitor 51 and the capacitor 53. The feedback portion of the oscillatory circuit includes the winding 52 of the transformer T1, a capacitor 53 used for phase angle correction purposes, and a transformer T2 having a primary winding 54 and two secondary windings 55 and 56, each secondary winding being coupled respectively to one of the switching transistors 55, 56 to control the current flow therethrough.

The inductance 48 is dimensioned so that it provides an inductive reactance which at parallel resonance compensates the capacitive reactance of the capacitor 49 and that of the load circuit as reflected in the driving circuit, i.e. on the primary side of the transformer.

Operation of the circuit may be visualized from the following description: The direct current from rectifier 43 charges the capacitor 49 through the switching transistor 45, the inductance 48 and the primary winding 47. Subsequently, the capacitor 49 discharges through the inductance 48, the switching transistor 46 and the winding 47. The frequency of oscillation of this circuit is primarily determined by the inductance and capacitance of the equivalent electrical circuit of the transducer, block 14. The alternating charge and discharge cycle of the capacitor 49 produces an alternating current signal in the primary winding 47 and in the secondary windings 50 and 52 to which the converter 14 is coupled. The winding 52 of the transformer T1 develops a feedback signal of the same frequency, the signal being phase-shifted by the capacitor 53 for causing it to be substantially in phase with the motional voltage $V_M$ appearing across the resistor $R_L$. The secondary windings 55 and 56 of the transformer T2 provide a driving signal to the switching transistors 45, 46 in order to synchronize the alternating charge and discharge cycle of the capacitor 49 with the parallel resonance frequency.

The circuit improvement comprehended by the present invention comprises the addition of a starting device effective during the start-up period as described in connection with FIGURES 1 through 4. To this end, a resistor 60, representing the resistance $R_S$ in FIGURE 4, is coupled in series with the converter 14. A normally open switch contact 61 of an electromagnetic relay 62 is connected in parallel with the resistor 60. The relay coil 62 is connected to the power source terminals 41, 42 via a rectifier 63. The resistor 64 and capacitor 65 represent an RC time delay circuit.

When starting the oscillatory circuit in response to closing the switch 40 the resistor 60 is connected in series with the converter 14. The capacitor 65 charges slowly via the resistor 64 and a brief period thereafter, the relay coil 62 is actuated, causing closing of the switch 61, thus effectively removing the resistance 60 from the circuit. In this manner the oscillatory circuit passes through the start-up period and the time delayed switching circuit removes the additional resistance from the circuit after the converter 14 has attained a sufficient amplitude of oscillation, see FIGURE 3. In a typical embodiment the resistor 60 is 100 ohms, resistor 64 is 2,200 ohms, and capacitor 65 is 10 mfd.

Figure 6:
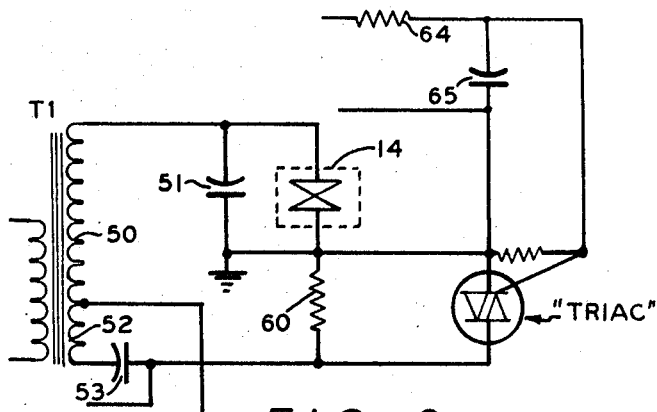
FIGURE 6 is a partial schematic circuit diagram showing one of the modifications.

In an alternative embodiment, FIGURE 6, the mechanical relay 62 having a switch 61 may be replaced by electronic circuit means comprising silicon controlled rectifiers (SCR), or a single bidirectional semiconductor switch known as "Triac," or switching transistors which are connected to duplicate the action of the relay. Alternatively, the resistor 60 may be provided with taps and a switching device, such as a multi-contact rotary step switch, may be used to gradually remove the resistance from the circuit rather than shunting the resistance in one step. Still further, the electronic time delay obtained by the RC circuit combination can be replaced by electrical or mechanical means, using a commercially available time delay relay.

Figure 7:
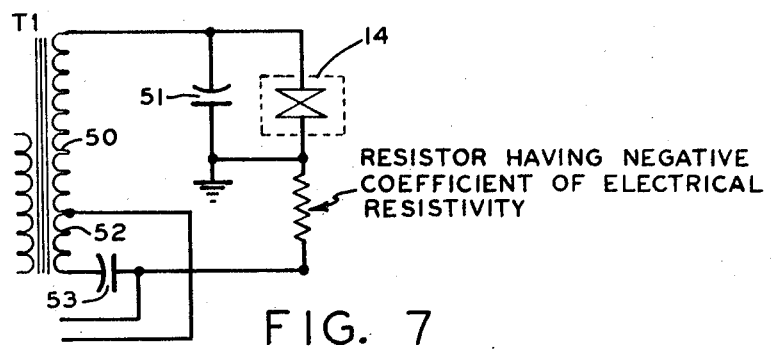
FIGURE 7 is a partial schematic circuit diagram illustrating another modification.

In still another embodiment, FIGURE 7, the resistor 60 can be constructed of material having a negative coefficient of electrical resistivity, causing the value of the resistance to decrease in response to increasing temperature or electrical current. In this latter embodiment, since the electrical resistance decreases, the separate switching means can be omitted.

Figure 3:
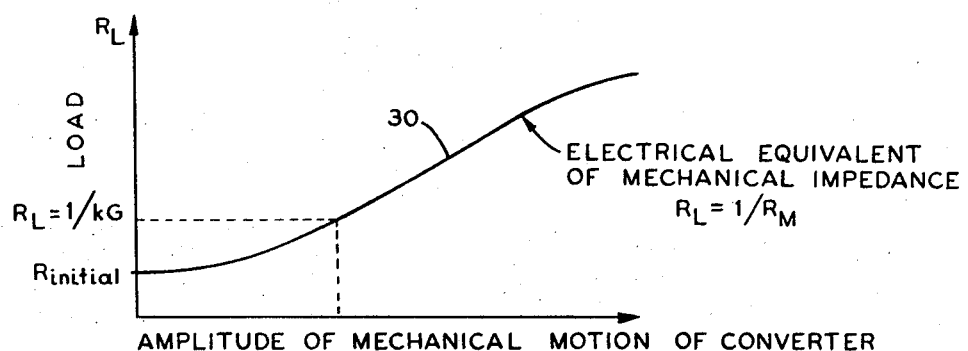
FIGURE 3 is a graph used for explanatory purposes.
Figure 8:
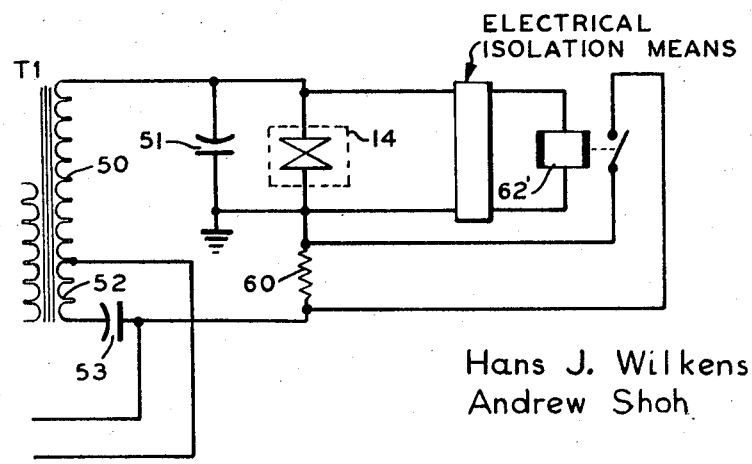
FIGURE 8 is a partial schematic circuit diagram of a further modification.

A still further and other alternative arrangement comprises sensing the amplitude of oscillation of the converter and actuating the relay 62 solely as a function of the mechanical motion of the converter 14, see FIGURE 3, rather than actuating the relay as a function of the lapse of time. This modification can be accomplished by connecting a voltage sensitive relay 62' having a normally open contact across the converter 14, see FIGURE 8. The voltage existing across the converter is responsive to the amplitude of mechanical motion of the converter. Hence, the relay can be selected to close its contact for establishing a low resistance shunt path across the resistor 60 at any time when the voltage across the converter has attained a value which corresponds to an amplitude of mechanical motion where the value of $R_L$ is equal or greater than $1/kG$, see FIGURE 3.

While there has been described and illustrated a certain preferred embodiment of the present invention and certain modifications have been indicated, it will be apparent to those skilled in the art that still further changes and modifications may be made without departing from the broad principles of this invention.

What is claimed is:

1. In an oscillatory circuit which includes a driving circuit portion and a load circuit portion having an electro-acoustic converter adapted to be coupled to a load for transferring acoustic energy thereto; said load circuit portion being coupled for being driven by said driving circuit portion; feedback means coupled between said load circuit portion and said driving circuit portion for sustaining the oscillations of said oscillatory circuit, and the reactances of said oscillatory circuit being selected to cause said oscillatory circuit to oscillate substantially at the natural mechanical parallel resonant frequency of said converter, the improvement comprising:
means for coupling during the start-up period of said oscillatory circuit an impedance means in series with said converter, the current flowing through the converter and impedance means providing for increased loop gain to set said oscillatory circuit into oscillation.

2. In an oscillatory circuit as set forth in claim 1, said impedance means in series with said converter being a resistive device.

3. In an oscillatory circuit as set forth in claim 1, said means for coupling an impedance means in circuit with said converter including a resistive device, a switching means coupled in parallel with at least a portion of said resistive device, and means for actuating said switching means after the passage of said start-up period for reducing the circuit resistance presented by said resistive device.

4. In an oscillatory circuit as set forth in claim 3, said switching means including an electrical relay.

5. In an oscillatory circuit as set forth in claim 3, said switching means comprising electronic circuit means adapted to operate as a switch.

6. In an oscillatory circuit as set forth in claim 5, said electronic circuit means including a semiconductor device.

7. In an oscillatory circuit which includes a driving circuit portion and a load circuit portion having an elector-acoustic converter adapted to be coupled to a load for transferring acoustic energy thereto; said load circuit portion being coupled for being driven by said driving circuit portion; feedback means coupled between said load circuit portion and said driving circuit portion for sustaining the oscillations of said oscillatory circuit, and the reactances of said oscillatory circuit being selected to cause said oscillatory circuit to oscillate substantially at the natural mechanical parallel resonant frequency of said converter, the improvement comprising:
a resistive element having a negative temperature coefficient of electrical resistivity coupled in said load circuit portion of said oscillatory circuit in series with said converter.

8. In an oscillatory circuit which includes a driving circuit portion and a load circuit portion having an electro-acoustic converter adapted to be coupled to a load for transferring acoustic energy thereto; said load circuit portion being coupled for being driven by said driving circuit portion; feedback means coupled between said load circuit portion and said driving circuit portion for sustaining the oscillations of said oscillatory circuit, and the reactances of said oscillatory circuit being selected to cause said oscillatory circuit to oscillate substantially at the natural mechanical parallel resonant frequency of said converter, the improvement comprising:
a resistive device coupled serially in circuit with said converter, the current flowing through the converter and resistive device increasing the feedback loop gain of said oscillatory circuit to set said oscillatory circuit into oscillation;
a switching means coupled in parallel with at least a portion of said resistive device to provide, when actuated, a low resistance shunt path across said portion, and
time delay means coupled for actuating said switching means to provide said shunt path a brief time period after said oscillatory circuit is set into oscillation and said feedback loop gain is of sufficient magnitude to sustain oscillation of said oscillatory circuit.

9. In an oscillatory circuit as set forth in claim 8 wherein said time delay means includes resistance and capacitance means.

10. In an oscillatory circuit which includes a driving circuit portion and a load circuit portion having an electro-acoustic converter adapted to be coupled to a load for transferring acoustic energy thereto; said load circuit portion being coupled for being driven by said driving circuit portion; feedback means coupled between said load circuit portion and said driving circuit portion for sustaining the oscillations of said oscillatory circuit, and the reactances of said oscillatory circuit being selected to cause said oscillatory circuit to oscillate substantially at the natural mechanical parallel resonant frequency of said converter, the improvement comprising:
a resistive device coupled serially in circuit with said converter for increasing the feedback loop gain of said oscillatory circuit;
a switching means coupled in parallel with at least a portion of said resistive device to provide, when actuated, a low resistance shunt path, and means coupled for actuating said switching means to provide said shunt path in response to the amplitude of mechanical motion of the converter having attained a predetermined value at which said feedback loop gain is of sufficient magnitude to sustain oscillation of said oscillatory circuit.

11. In an oscillatory circuit as set forth in claim 10 wherein said means coupled for actuating said switching means is a voltage responsive device coupled to receive a potential responsive to the voltage across said converter.

References Cited

UNITED STATES PATENTS

| | | | |
|---|---|---|---|
| 3,100,886 | 8/1963 | Marks | 331—116 X |
| 3,256,497 | 6/1966 | Walker. | |

ROY LAKE, Primary Examiner

S. H. GRIMM, Assistant Examiner

U.S. Cl. X.R.

259—1; 331—113, 158